United States Patent [19]

Takeuchi et al.

[11] Patent Number: 5,083,646
[45] Date of Patent: Jan. 28, 1992

[54] HYDRAULIC DEVICE FOR OPERATING A CLUTCH IN AN INDUSTRIAL VEHICLE

[75] Inventors: Toshiyuki Takeuchi; Shuji Ohta, both of Kariya, Japan

[73] Assignee: Kabushiki Kaisha Toyoda Jidoshokki Seisakusho, Kariya, Japan

[21] Appl. No.: 560,100

[22] Filed: Jul. 31, 1990

[30] Foreign Application Priority Data

Aug. 7, 1989 [JP] Japan .................. 1-204338
Aug. 7, 1989 [JP] Japan .................. 1-204339

[51] Int. Cl.$^5$ ..................... B60K 41/22; F16D 25/14
[52] U.S. Cl. .................. 192/3.57; 192/3.62; 192/83
[58] Field of Search .......... 192/3.57, 3.61, 3.62, 192/3.63, 109 F, 0.08, 0.092, 83

[56] References Cited

U.S. PATENT DOCUMENTS

| | | | |
|---|---|---|---|
| 2,272,571 | 2/1942 | Maybach | 192/3.57 X |
| 3,262,523 | 7/1966 | Gordon | 192/3.57 X |
| 3,352,392 | 11/1967 | Black et al. | 192/3.57 |
| 3,438,469 | 4/1969 | Hilpert | 192/3.57 |
| 3,459,285 | 8/1969 | Lamburn et al. | 192/3.57 |
| 4,146,120 | 3/1979 | Stevens | 192/3.57 X |
| 4,585,100 | 4/1986 | Sugano | 192/3.31 |
| 4,662,493 | 5/1987 | Aoki et al. | 192/3.57 X |

FOREIGN PATENT DOCUMENTS 785511 10/1957 United Kingdom ............ 192/3.57

OTHER PUBLICATIONS

Association of Agricultural Machinery, 1988, Japan.

*Primary Examiner*—Rodney H. Bonck
*Attorney, Agent, or Firm*—Brooks Haidt Haffner & Delahunty

[57] ABSTRACT

A hydraulic device for operating a clutch in an industrial vehicle having a transmission comprising shift changeable gears and manually operated shift levers. Gear actuating hydraulic boosters are provided for hydraulically actuating the shift changeable gears, and the clutch is actuated by a clutch cylinder. The hydraulic device comprises a clutch circuit extending between a hydraulic pump and the clutch cylinder, and a booster circuit extending between the hydraulic pump and the boosters. A gate valve is arranged in the clutch circuit and is movable in response to pressure of hydraulic oil in the booster circuit, so that the normally closed gate valve is opened when the manually operable shift levers are operated. Also, a pressure control circuit is branched from the clutch circuit and again branched into parallel third and fourth hydraulic circuits. A forward and reverse gate valve and a speed change gate valve are arranged in the third and fourth hydraulic circuits, respectively. A check valve and a first accumulator are arranged in the third hydraulic circuit and a second accumulator is arranged in the second hydraulic circuit upstream of the second gate valve for controlling the use of pressure applied to the clutch cylinder.

16 Claims, 13 Drawing Sheets

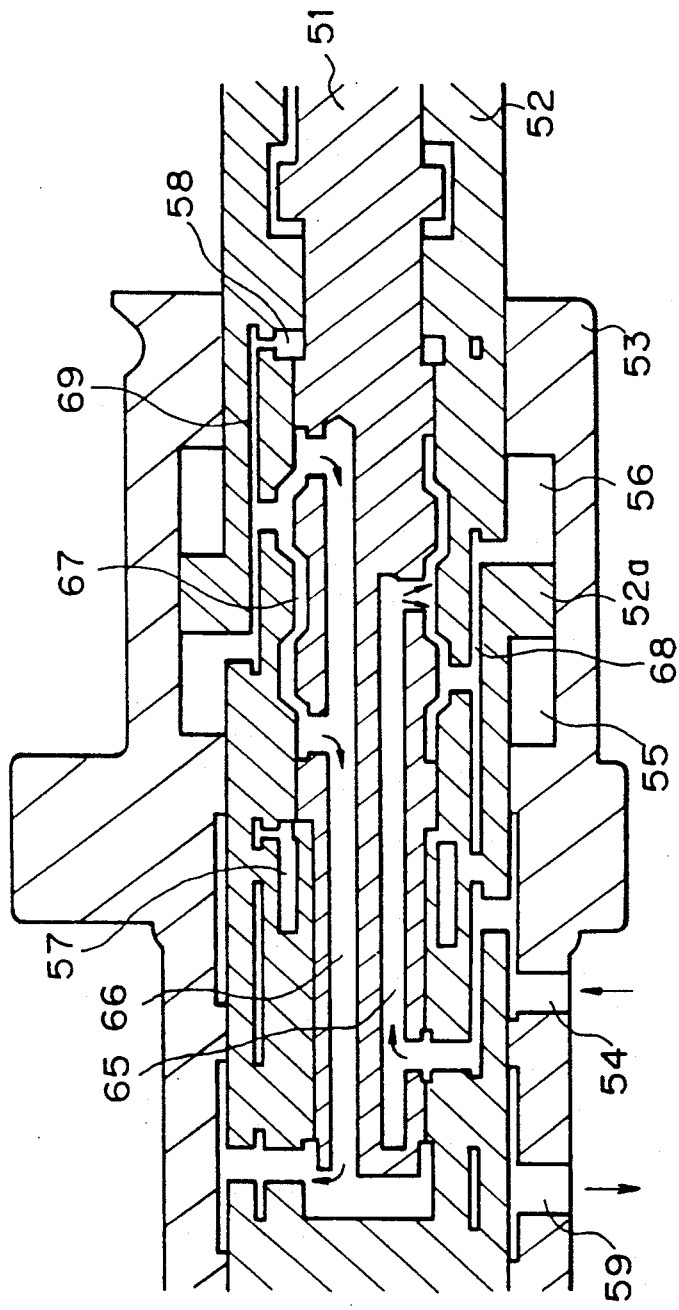

HYDRAULIC DEVICE FOR OPERATING A CLUTCH IN AN INDUSTRIAL VEHICLE

BACKGROUND OF THE INVENTION

1. Field of the Invention

The present invention relates to a hydraulic device for operating a clutch in an industrial vehicle, such as a forklift truck.

2. Description of the Related Art

In an industrial vehicle having a manually operable transmission with shift changeable gears, such as a forklift truck, a forward and reverse shift lever and a speed change shift lever are provided, to change the gears, and a hydraulically operable clutch is incorporated in the transmission. The clutch is actuated by a hydraulic oil in a clutch actuating hydraulic circuit in which pressure control valves are arranged to control the operation of the clutch to engage or disengage clutch members from each other in response to the movements of the forward and reverse shift lever and the speed change shift lever.

A typical conventional hydraulic circuit for operating a clutch is shown in FIG. 14 of the attached drawings, in which a clutch actuating hydraulic circuit extends between an oil pump 204 and clutch actuating hydraulic cylinder 208 for actuating the clutch (not shown). A pressure regulating valve 205, a pressure modulating valve 209, a forward and reverse gate valve 206, a high and low speed change gate valve 207, and an accumulator 210 are arranged in the circuit, and an oil tank 215 is provided. A forward and reverse shift lever 201 and a speed change shift lever 211 are provided in the vehicle for the operation of a transmission (not shown). The forward and reverse shift lever 201 is mechanically connected to a forward and reverse shift fork 202 which engages shift changeable gears in the transmission (not shown), and is incorporated in a forward and reverse shift valve 203 which, in turn, is hydraulically connected to the forward and reverse gate valve 206, whereby the forward and reverse shift fork 202 moves to change the gears and the forward and reverse shift valve 203 changes from a neutral, port closed position to a port open position, in response to the movement of the forward and reverse shift lever 201. Thus the forward and reverse gate valve 206 opens after the forward and reverse shift valve 203 is opened, and the hydraulic oil is admitted through the clutch actuating hydraulic circuit from the oil pump 204 to the clutch actuating hydraulic cylinder 208 (if the speed change gate valve 207 is opened), to thereby engage clutch members of the clutch in accordance with a rise of the pressure of the hydraulic oil in the clutch actuating hydraulic circuit. The rise of the pressure of the hydraulic oil in the clutch actuating hydraulic circuit is regulated by the pressure modulating valve 209 and the accumulator 210.

Also, the speed change shift lever 211 is connected to a speed change valve 211 which, in turn, is hydraulically connected to a speed change shift valve 213. The speed change shift valve 213 is mechanically connected to a speed change shift fork 214, and hydraulically connected to the speed change gate valve 207, whereby the speed change shift fork 204 moves to change the gears in response to the movement of the speed change shift lever 211, and then the speed change shift valve 203 allows the hydraulic oil to flow therethrough to the speed change gate valve 207, allowing the hydraulic oil to be admitted to the clutch actuating hydraulic cylinder 208 through the clutch actuating hydraulic circuit (if the forward and reverse gate valve 206 is opened), to thereby engage clutch members of the clutch as in the above-described forward and reverse shift operation.

When one of the forward and reverse shift lever 201 and the speed change shift lever 211 is at the neutral position, and the gears are disengaged, the associated one of the gate valves 206 and 207 is returned to the initial position in which the clutch actuating hydraulic circuit is shut down and the clutch actuating hydraulic cylinder 208 is connected to the oil tank 215, causing the clutch to be disengaged.

One of the problems of the conventional hydraulic device is that, when the once-engaged gears are disengaged by moving the forward and reverse shift lever 201 or the speed change shift lever 211 to the respective neutral position, the arrangement of the hydraulic device is such that the clutch is disconnected after the gears are disengaged. This is because the forward and reverse shift lever 201 and the speed change shift lever 211 for operating the gears are mechanically connected to the movable valve elements of the shift valves 203 and 213 controlling the gate valves 206 and 207, respectively, and the ports of the respective shift valves 203 and 213 are opened by the moving valve elements. Thus the clutch is disengaged while the gears are being disengaged, and the gears may clash with each other.

Another problem of the conventional hydraulic device is that the pressure of the hydraulic oil admitted to the clutch actuating hydraulic cylinder 208 rises constantly, i.e., the rise of the pressure of the hydraulic oil is constantly regulated by the pressure modulating valve 209 and the accumulator 210 when either the vehicle is started or a shift change is carried out. Regarding the time of the rise of the pressure of the hydraulic oil, preferably the time of the rise of the pressure is prolonged, so that the pressure rises gradually to mitigate shock when the vehicle starts. This means, however, that the connection of the clutch when the gear change is carried out while the vehicle is travelling is delayed, and a relatively long time lag occurs. On the contrary, if the time of the rise of the pressure is shortened, to reduce this time lag, the shock occurring when the vehicle starts will become extensive.

SUMMARY OF THE INVENTION

The object of the present invention is to solve the above problems and to provide a hydraulic device for operating a clutch in an industrial vehicle, in which a clutch is reliably disengaged prior to a disengagement of speed change gears upon a shift change of a transmission.

Another object of the present invention is to solve the above problems and to provide a hydraulic device for operating a clutch in an industrial vehicle in which the clutch engaging time when the vehicle is started and when a gear change, respectively, is carried out while the vehicle is travelling, can be altered.

According to one aspect of the present invention, there is provided a hydraulic device for operating a clutch in an industrial vehicle having a motor and a transmission having at least two forward positions and at least two reverse positions, with a clutch arranged between the motor and the transmission, the transmission comprising shift changeable gears and at least one manually operable shift lever. The hydraulic device also comprises: a hydraulic pump means; a clutch actuating hydraulic cylinder for hydraulically actuating the clutch; a first clutch actuating hydraulic circuit extending between the hydraulic pump means and the clutch actuating hydraulic cylinder; a second gear actuating hydraulic circuit extending between the hydraulic pump means and gear actuating hydraulic means, for hydraulically actuating the shift changeable gears in response to a movement of at least one shift lever; and a gate valve arranged in the first hydraulic circuit and movable in response to pressure of hydraulic oil in the second hydraulic circuit on the upstream side of the gear actuating hydraulic means, so that the gate valve is normally closed and opened for releasing a hydraulic oil in the first hydraulic circuit to an oil tank when at least one manually operable shift lever is operated.

With this arrangement, the pressure in the gear actuating hydraulic means for moving the shift changeable gears is introduced to the gate valve as a pilot pressure and becomes a signal for disconnecting the clutch; namely, when at least one manually operable shift lever is operated, the pressure in the gear actuating hydraulic means rises to a high pressure level sufficient to move the shift changeable gears, and the valve opening pressure of the gate valve is lower than such a high pressure level so that the gate valve opens to disconnect the clutch substantially prior to the movement of the gear actuating hydraulic means.

According to another aspect of the present invention, there is provided a hydraulic device for operating a clutch in an industrial vehicle having a motor and a transmission with the clutch arranged between the motor and the transmission, the transmission comprising a set of shift changeable gears, a forward and reverse shift lever having a neutral position, a forward position, and a reverse position, and a speed change shift lever having a neutral position and at least two speed changing positions. The hydraulic device also comprises: a hydraulic pump means; a clutch actuating hydraulic cylinder for hydraulically actuating the clutch; a first clutch actuating hydraulic circuit extending between the hydraulic pump means and the clutch actuating hydraulic cylinder; a second pressure controlling hydraulic circuit branched from the first clutch actuating hydraulic circuit to an oil tank, the second pressure controlling a hydraulic circuit including branched third and fourth hydraulic circuits in parallel to each other; a first forward and reverse gate valve arranged in the third hydraulic circuit and movable in response to a movement of the forward and reverse shift lever so that the first gate valve is opened when the forward and reverse shift lever is at the neutral position and closed when the forward and reverse shift lever is at one of the forward and reverse positions; a second speed change gate valve arranged in the fourth hydraulic circuit and movable in response to a movement of the speed change shift lever so that the second gate valve is opened when the speed change shift lever is at the neutral position and closed when the speed change shift lever is at one of the speed changing positions; a check valve arranged in the third hydraulic circuit upstream of the first gate valve so that flow of the hydraulic oil toward the first hydraulic circuit is prevented; a first accumulator arranged in the third hydraulic circuit between the check valve and the first gate valve for controlling a rise of the pressure applied to the clutch actuating hydraulic cylinder; and a second accumulator arranged in the second hydraulic circuit upstream of the second gate valve for controlling a rise of the pressure applied to the clutch actuating hydraulic cylinder.

With this arrangement, when the forward and reverse shift lever and the speed change shift lever are at the neutral positions, respectively, the first forward and reverse gate valve and the second speed change gate valve are at the open positions, respectively, and the second pressure controlling hydraulic circuit and the first clutch actuating hydraulic circuit are in communication with the oil tank so that the clutch is disengaged. Upon a start of the vehicle, the forward and reverse shift lever is moved to one of the forward and reverse positions and the speed change shift lever is moved to one of the speed change positions, so that the first forward and reverse gate valve and the second speed change gate valve are moved to the closed positions, to block the second pressure controlling hydraulic circuit from the oil and thereby apply the pressure from the oil pump to the first clutch actuating hydraulic circuit. Thus the pressure of the first clutch actuating hydraulic circuit and of the clutch actuating hydraulic means rises to cause the clutch to be engaged. The rise of the pressure is controlled by both the first and second accumulators, and the pressure rise is slow.

When the vehicle is started, the first forward and reverse gate valve and the second speed change gate valve are maintained at the open positions, respectively, with the check valve preventing a back flow of the hydraulic oil toward the first hydraulic circuit, to keep the first accumulator filled with the hydraulic oil. Then the speed change shift lever will be moved, for example, from the low position to the high position, through the neutral position, to change the speed of the vehicle while the vehicle is travelling and the forward and reverse shift lever is maintained at the previous position, and thus the second speed change gate valve is correspondingly moved from the closed position to the neutral, open position, and again to the closed position. When the second speed change gate valve is first moved to the neutral, open position, the second pressure controlling hydraulic circuit and the first clutch actuating hydraulic circuit are in communication with the oil tank so that the clutch is instantaneously disengaged and the hydraulic oil accumulated in the second accumulator is released. Then the second speed change gate valve is again moved to the closed position, to effect the gear change and reengage the clutch. In this case, the rise of the pressure is controlled by only the second accumulator, since the first accumulator is already filled, and the pressure rise is quick.

Accordingly, it is possible to engage the clutch by applying the slowly rising pressure to the clutch actuating hydraulic cylinder by filling both the first and second accumulators, to start the vehicle with less shock, and to engage the clutch by applying the quickly rising pressure to the clutch actuating hydraulic cylinder by filling only the second accumulator.

BRIEF DESCRIPTION OF THE DRAWINGS

The present invention will become more apparent from the following description of the preferred embodiments, with reference to the accompanying drawings, in which:

FIG. 3B is a partly enlarged cross-sectional view of the shift booster of FIG. 3A;

DESCRIPTION OF THE PREFERRED EMBODIMENTS

Figure 1:
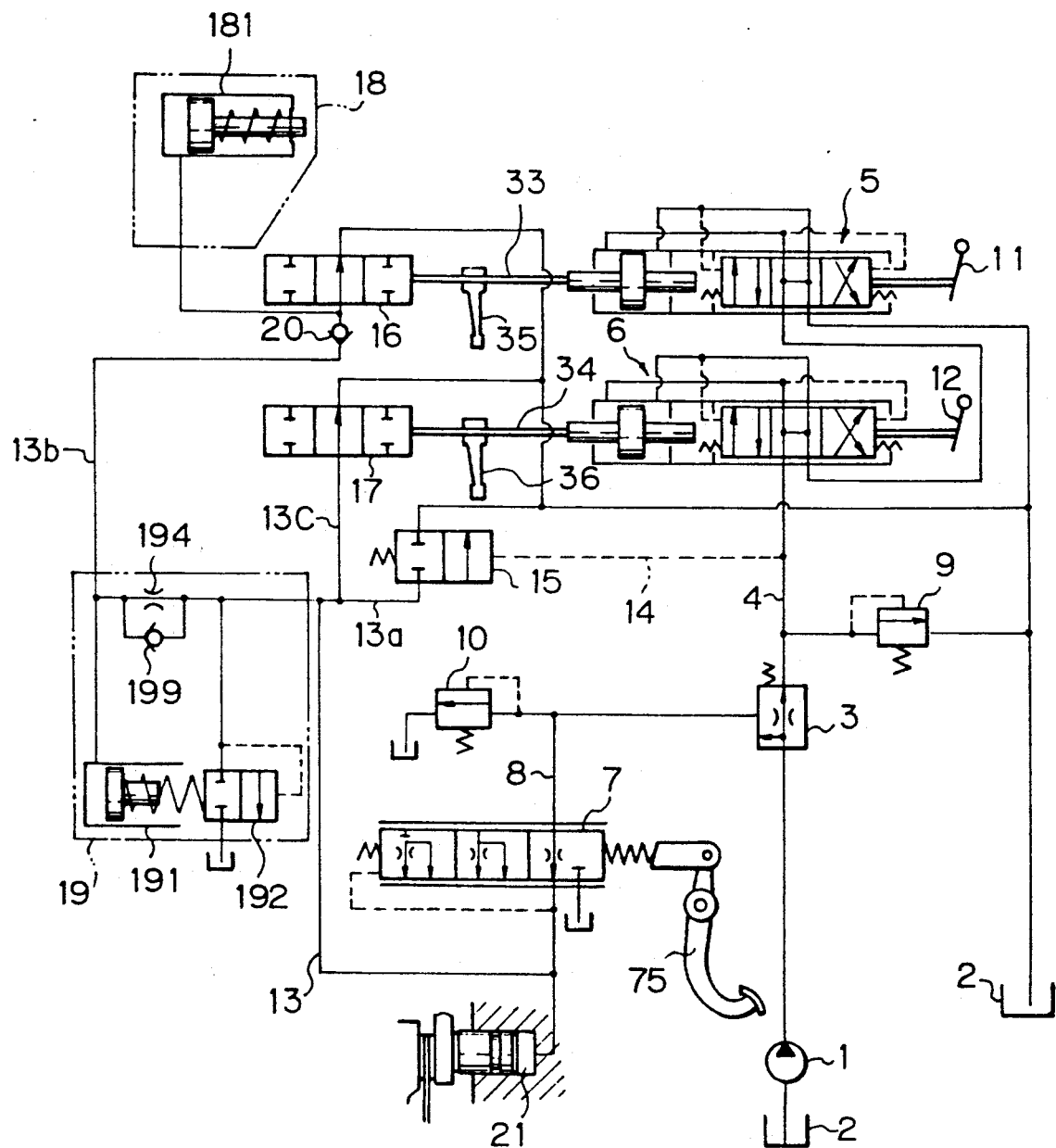
FIG. 1 is a circuit diagram of a hydraulic device for operating a clutch according the first embodiment of the present invention.
Figure 2:
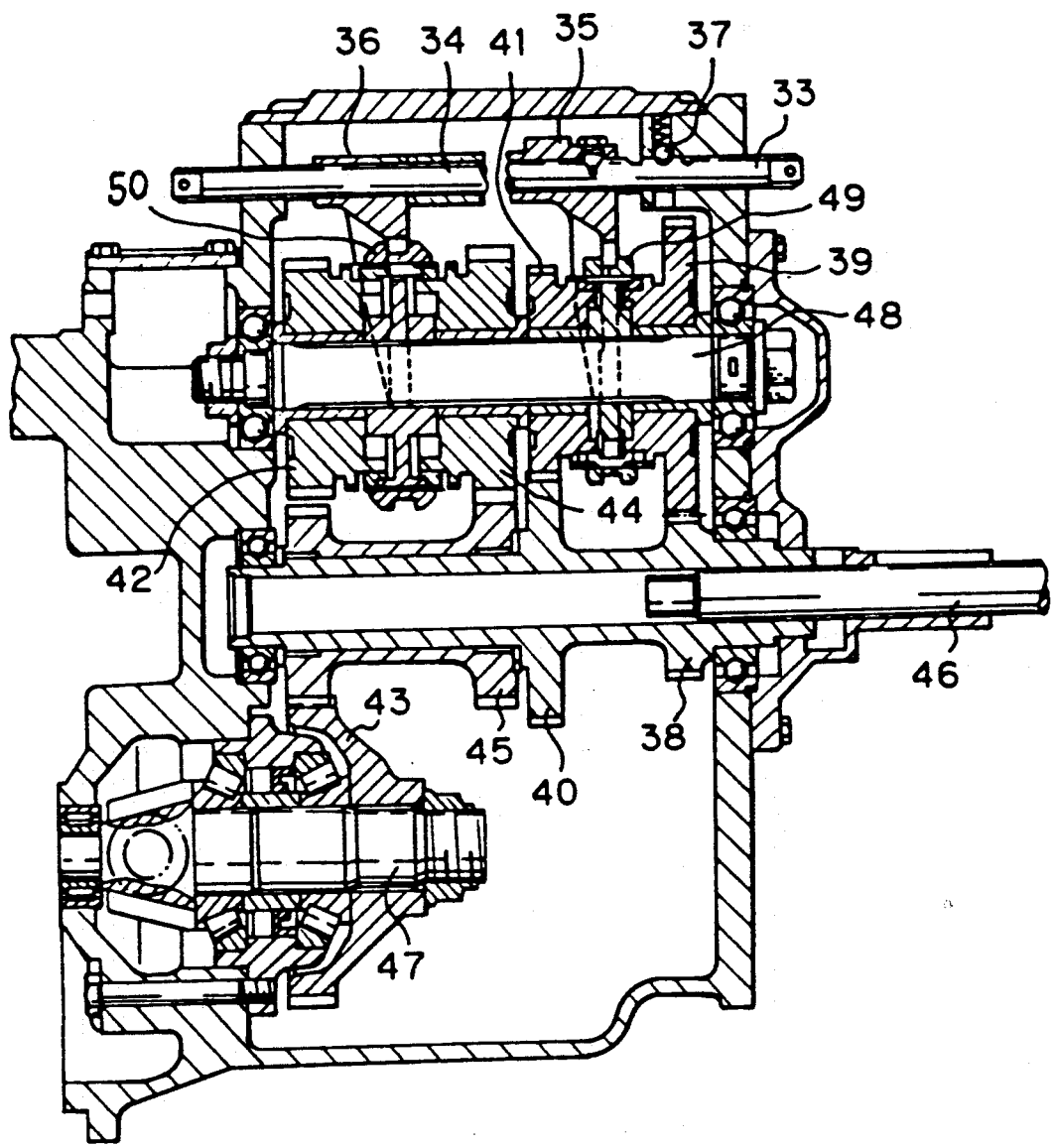
FIG. 2 is a cross-sectional view of the transmission.

The first embodiment of the present invention is described with reference to FIGS. 1 to 9. The industrial vehicle such as a forklift truck has a motor such as an electric motor for the traction of the vehicle and a transmission equipped with a manual clutch. FIG. 1 is a circuit diagram of a hydraulic device for operating the clutch, in which an oil pump 1, an oil tank 2, a forward and reverse shift lever 11, a speed change shift lever 12, and a clutch actuating hydraulic cylinder 21 are shown. The transmission is shown in FIG. 2 and the clutch is shown in FIG. 7, as will be briefly described later.

In FIG. 1, a hydraulic circuit originating from the oil pump 1 is divided into a gear actuating hydraulic circuit (booster circuit) 4 and a clutch actuating hydraulic circuit (clutch circuit) 8, at a flow dividing valve 3, and a pressure controlling hydraulic circuit (pressure control circuit) 13 is branched from the clutch circuit 8. The pressure control circuit 13 is further branched into three parallel hydraulic circuits 13a, 13b and 13c. The booster circuit 4 includes a gear actuating hydraulic means comprising, in series, a speed change shift booster 6 and a forward and reverse shift booster 5, and terminates at the oil tank 2. The speed change shift booster 6 is connected to the speed change shift lever 12 and has an output shaft 34 to which a speed change shift fork 36 is attached. The forward and reverse shift booster 5 is also connected to the forward and reverse shift lever 11 and has an output shaft 33 to which a forward and reverse shift fork 35 is attached. A relief valve 9 is also provided in the booster circuit 4, to determine the maximum working pressure of the shift boosters 5 and 6.

The clutch circuit 8 includes a pressure regulating valve 10, to determine the maximum working pressure of the clutch actuating hydraulic cylinder 21, and an inching valve 7. The pressure control circuit 13 is branched from the clutch circuit 8 between the inching valve 7 and the clutch actuating hydraulic cylinder 21, and gate valves 15, 16 and 17 are arranged in the parallel hydraulic circuits 13a, 13b and 13c, respectively. The gate valve 15 is constructed such that it is movable between an open position and a closed position in response to pressure of hydraulic oil in the booster circuit 4 upstream of the speed change shift booster 6, i.e., a pilot line 14 extends so that the gate valve 15 is normally closed and opened for releasing hydraulic oil in the clutch circuit 8 to the oil tank 2 when the pressure for actuating the speed change shift booster 6 is increased by operating the speed change shift lever 12.

The forward and reverse valve 16 is connected to the output shaft 33 of the forward and reverse shift booster 5 and constructed such that it is movable therewith among a central open position for releasing hydraulic oil in the clutch circuit 8 to the oil tank 2 and opposite side closed positions on either side of the central open position, respectively. The speed change gate valve 17 is connected to the output shaft 34 of the speed change shift booster 6 and constructed such that it is movable therewith among a central open position for releasing hydraulic oil in the clutch circuit 8 to the oil tank 2 and side closed positions on either side of the central open position.

A check valve 20 is arranged in the branch circuit 13b to prevent a flow of the hydraulic oil toward the upstream clutch circuit 8. A first accumulator 18 is arranged in the branch circuit 13b between the check valve 20 and the forward and reverse gate valve 16, for controlling a rise of the pressure applied to the clutch actuating hydraulic cylinder 21, mainly at a start of vehicle. A second accumulator 19 is also arranged in the branch circuit 13b and is located upstream of the speed change gate valve 17, for controlling a rise of the pressure applied to the clutch actuating hydraulic cylinder 21, both at a start of the vehicle and at a later speed change. The second accumulator 19 comprises a combination of an accumulator 191 and a modulating valve 192.

FIG. 2 shows the manually operable transmission having two forward positions and two reverse positions, as used in a forklift truck and known as a synchromesh type transmission. The output shaft 34 of the speed changing shift booster 6 and the output shaft 33 of the forward and reverse shift booster 5 extend in the transmission and axially move therein, whereby the forks 36 and 35 thereof change the positions of the gears in the transmission. The positions of the output shafts 33 and 34 are maintained by detents 37.

In FIG. 2, the gears comprise a low speed gear set 38 and 39, a high speed gear set 40 and 41, a forward gear set 42 and 43 with an idle gear therebetween (not shown), and a reverse gear set 44 and 45. The gears 38 and 40 are formed on an integral member which is attached to an input shaft 46 for rotation therewith. The gears 39 and 41, and gears 42 and 44 are rotatably arranged around a splined shaft 48. Clutch hub sleeves 49 and 50 (including associated clutch hub members) are arranged between the gears 39 and 41, and between the gears 42 and 44, respectively, and coupled on one hand to the forks 35 and 36 and engaged on the other hand with the splined shaft 48 for rotation therewith, so that the clutch hub sleeves 49 and 50 can be axially moved to cause one of the respective gears 39 and 41, and 42 and 44 to rotationally couple with the splined shaft 48. Thus the rotation of the input shaft 46 is transmitted to an output shaft 47 through one of the gears 39 and 41, the splined shaft 48 and one of the gears 42 and 44.

Figure 3A:
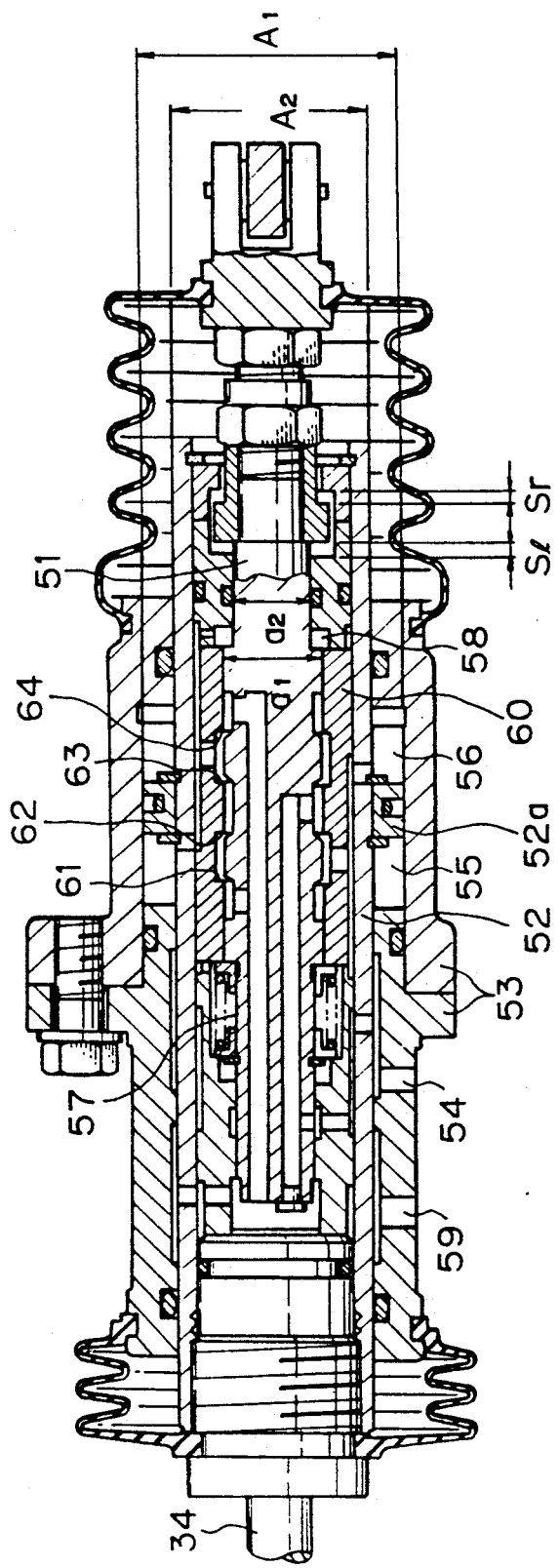
FIG. 3A is a detailed cross-sectional view of the shift booster in FIG. 1 for actuating the shift fork.

FIG. 3A shows the speed change shift booster 6 in greater detail. Note, the forward and reverse shift booster 5 has an identical construction to the speed change shift booster 6, and thus this description also applies to the forward and reverse shift booster 5 and its associated elements.

The speed change shift booster 6 comprises a tubular cylinder housing 53 and a tubular piston rod 52 slidably inserted in the tubular cylinder housing 53. The tubular piston rod 52 has a piston 52a, and the tubular cylinder housing 53 has two cylinders 55 and 56 formed on either side of the piston 52a. The tubular piston rod 52 also has a tubular valve body 60 fixed thereto and an input shaft 51 is slidably inserted in the tubular valve body 60 with a limited relative movement therebetween, as defined by the gaps Sl or Sr. Reaction chambers 57 and 58 are formed between the tubular valve body 60 and the input shaft 51. A spring is arranged in the reaction chamber 57. The input shaft 51 is connected at the right end thereof to the speed change shift lever 12 (not shown in FIG. 3A) and the tubular valve body 60 is connected at the left end thereof to the output shaft 34.

The tubular cylinder housing 53 also has a single inlet port 54 for communication with the oil pump 1 and a single exit port 59 for communication with the oil tank 2 (via the forward and reverse shift booster 5 if the speed change shift booster 6 is arranged in series with the forward and reverse shift booster 5 as shown in FIG. 1). The tubular valve body 60 and the input shaft 51 form therein valve ports and valves for selectively communicating the inlet port 54 and the exit port 59 with the cylinders 55 and 56 and the reaction chambers 57 and 58. FIG. 3B shows such valve ports and valves on an enlarged scale, in which the tubular piston rod 52 and the tubular valve body 60 are integrally hatched, for clarity, and represented by the numeral 52.

FIG. 3B shows an infeed port 65 and a return port 66, both axially extending in the input shaft 51. The inlet port 54 normally communicates with the left end portion of the infeed port 65 and the exit port 59 normally communicates with the left end portion of the return port 66. The right end portion of the infeed port 65 is connected to an annular valve arrangement 67 comprising annular stepped passage and valve engaging portions 61, 62, 63, and 64 (FIG. 2A). The left end portion of the annular valve arrangement 67 is connected to a first axial passage 68 which is connected to the right cylinder 56 and to the left reaction chamber 57. The right end portion of the annular valve arrangement 67 is connected to a second axial passage 69, which is connected to the left cylinder 55 and to the right reaction chamber 58. The right end portion of the return port 66 is connected to the left end portion and the left end portion of the annular valve arrangement 67, and thus to the cylinders 55 and 56, and the reaction chambers 57 and 58.

FIGS. 3A and 3B show the speed change shift lever 12 and the speed change shift booster 6 at neutral positions in which the hydraulic oil entering the inlet port 54 flows through the infeed port 65, the annular valve arrangement 67, both first and second axial passages 68 and 69, both cylinders 55 and 56, both reaction chambers 57 and 58, and the return port 66 to the exit port 59, from which the hydraulic oil is released to the oil tank 2. An equilibrium of the pressure is established at the opposite cylinders 55 and 56, and the pressure of the fluid flowing through the speed change shift booster 6 is constant.

When the speed change shift lever 12 is moved to the right in the drawings, the input shaft 51 first moves relative to the still stationary tubular valve body 60 so that the valve engaging portions 62 and 64 close a portion of the annular passage in the annular valve arrangement 67, and thus a portion of the flow of the hydraulic oil toward the right cylinder 56 and the left reaction chamber 57 is shut down while the right cylinder 56 and left reaction chamber 57 are maintained in communication with the return port 66. Therefore, the pressure of the hydraulic oil in the left cylinder 55 surpasses the pressure in the right cylinder 56, and the piston 52a with the piston rod 52 is hydraulically actuated to the right. Accordingly, the manual operation of the speed change shift lever 12 is hydraulically boosted by the speed change shift booster 6. The pressure in the right reaction chamber 58 gives a reaction force to the input shaft 51, which resists the movement of the speed change shift lever 12. The reaction force works in proportion to the pressure working area as defined by (a1-a2), while the boosting force works in proportion to the pressure working area as defined by (A1-A2). Therefore, the piston rod 52 with the output shaft 34 is actuated with the boost ratio of (A1-A2)/(a1-a2). The output shaft 34 is thus moved to change the gears 39 and 41 and to move the speed change gate valve 17 from the central open position to the right closed position. The other output shaft 33 is also moved to change the gears 42 and 44 and to move the forward and reverse gate valve 16 from the central open position to the right closed position.

With this boost action, the pressure of the hydraulic oil in the booster circuit 4 upstream of the speed change shift booster 6, more particularly, upstream of the annular valve arrangement 67, is increased due to a restriction of a portion of the flow area at the valve engaging portions 62 and 64. Therefore, the pilot pressure delivered from the booster circuit 4 through the pilot line 14 to the gate valve 15 (FIG. 1) is also increased so that the gate valve 15 is moved to the open position. Note, the pressure of the hydraulic oil in the booster circuit 4 upstream of the speed change shift booster 6 instantaneously increases when the valve engaging portions 62 and 64 narrow the passage, and at that time, the piston rod 52 is just about to move; i.e., the pressure of the hydraulic oil increases prior to the substantial hydraulic actuation of the piston rod 52. Therefore, the clutch is first disengaged by releasing the pressure of the pressure control circuit 13 by opening the gate valve 15, and then the gears in the transmission are engaged. When the speed changing shift lever 12 is moved to the final position and released by the operator, the valve engaging portions 62 and 64 open the passage in the annular valve arrangement 67 and the hydraulic oil is again fed to the right cylinder 56 and the left reaction chamber 57. Thus the pressure of the hydraulic oil drops to the initial normal level and the gate valve 15 closes.

When the speed changing shift lever 12 is moved to the left, the speed change shift booster 6 functions in a manner similar to the above description but in the opposite direction, by the closing of the valve engaging portions 61 and 63 and the action of the pressure of the hydraulic oil in the right cylinder 56 and the left reaction chamber 57. In this case also, the clutch is first disengaged and then the gears in the transmission engaged. Then the pressure of the hydraulic oil drops to the initial normal level and the gate valve 15 closes. Where the transmission is shifted, for example, from the low position to the high position and the speed change shift lever 12 is operated from the left position to the right position through the central neutral position, the pressure of the hydraulic oil in the booster circuit 4 first rises from the initial normal level to the working level for hydraulically actuating the speed change booster 6 when the speed change shift lever 12 is just moved. In this case, the clutch is disengaged prior to the substantial movement of the tubular piston rod 52, i.e., prior to the disengagement of the low speed gears of the transmission.

Figure 4:
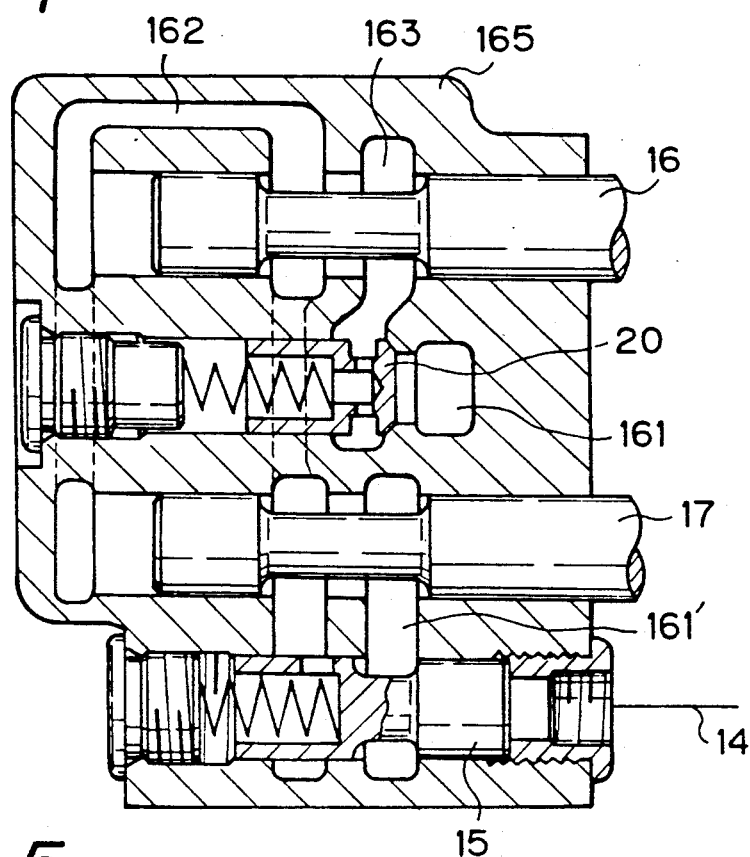
FIG. 4 is detailed cross-sectional view of the gate valves and the check valve in FIG. 1.

FIG. 4 shows that the three gate valves 15, 16 and 17, and the check valve 20 are formed in a common housing 165. A port 161 communicates with one of the parallel hydraulic circuits 13c and a port 161, communicates with two of the parallel hydraulic circuits 13a and 13b. A port 162 is an exit port communicating with the oil tank, and a port 163 communicates with the first accumulator 18. Valves in FIG. 4 are in the identical positions shown in FIG. 1, showing the neutral position of the transmission. It can be understood that the gate valve 15 can be urged to the left, and the other gate valves 16 and 17 can be urged either way. The check valve 20 prevents a back flow of the hydraulic oil in the first accumulator 18 toward the port 161.

Figure 5:
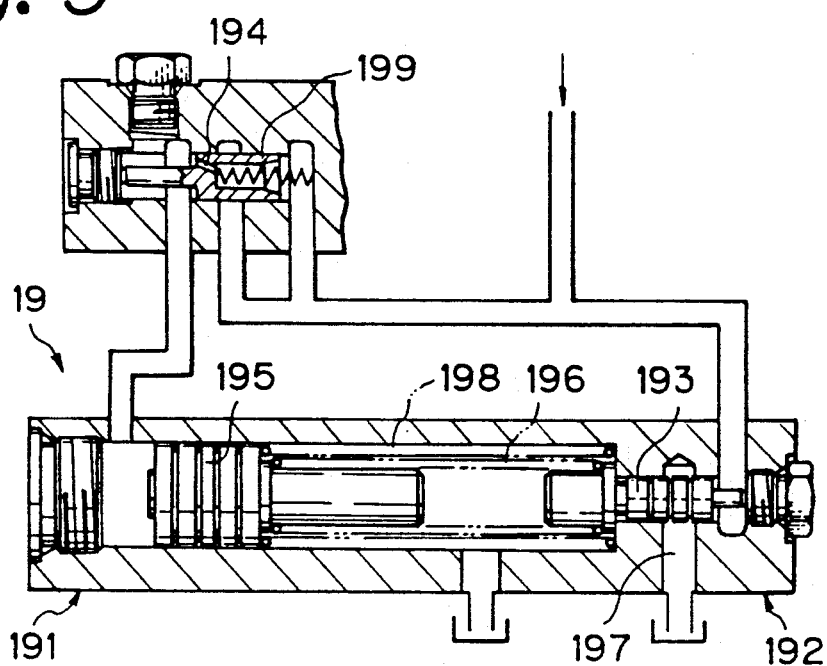
FIG. 5 is a detailed cross-sectional view of the second accumulator in FIG. 1.

FIG. 5 shows the second accumulator 19, which comprises an accumulator 191 with a movable accumulator piston 195, a modulating valve 192 with a modulating piston 193 arranged in alignment with each other, a modulating spring 196 and an accumulator spring 196 arranged between the pistons 193 and 195, and the first accumulator 18 comprises a movable accumulator piston 181 (FIG. 1) which spreads the volume in the first accumulator 18 to be accumulated with the hydraulic oil when the pressure in the circuit 13c rises. In FIG. 5, the hydraulic oil enters the chamber on the right side of the modulating piston 193 and the chamber on the left side of the accumulator piston 195, via an orifice 194. When the pressure is rising in the clutch circuit 8 and in the pressure control circuit 13, the pressure of the hydraulic oil acting on the modulating piston 193 causes the modulating piston 193 to move to the left against the modulating spring 196, to thereby open a gap between the modulating piston 193 and the tank port 197, so that the pressure rises, as shown by the solid line, toward the point A in FIG. 9 while maintaining an equilibrium between the pressure and the force of the modulating spring 196. With a rise of the pressure, the accumulator piston 195 then moves against the accumulator spring 198, accumulating the hydraulic oil in the accumulator 191 and compressing the modulating spring 196 to increase the opening pressure of the modulating valve 192 so that the pressure of the hydraulic oil rises, as shown by the solid line, from the point A to the point B in FIG. 9. The accumulator piston 195 further moves until it abuts against the accumulator piston 195 so that the pressure of the hydraulic oil rises, as shown by the solid line, from the point B to the point C defining the maximum pressure in FIG. 9. A check valve 199 allows the back flow of the hydraulic oil from the accumulator 191.

Figure 6:
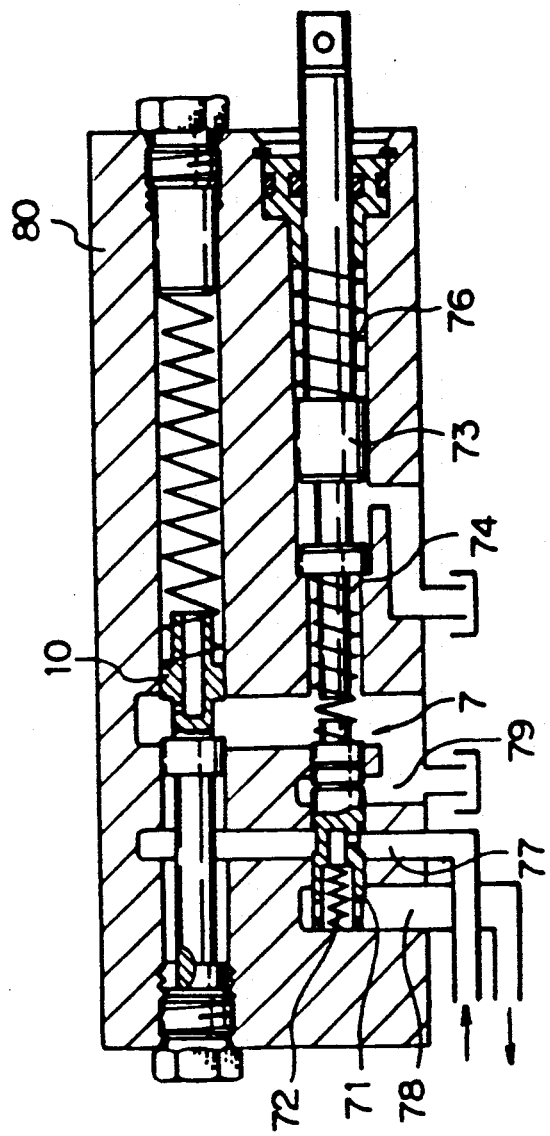
FIG. 6 is a detailed cross-sectional view of the inching valve in FIG. 1.
Figure 7:
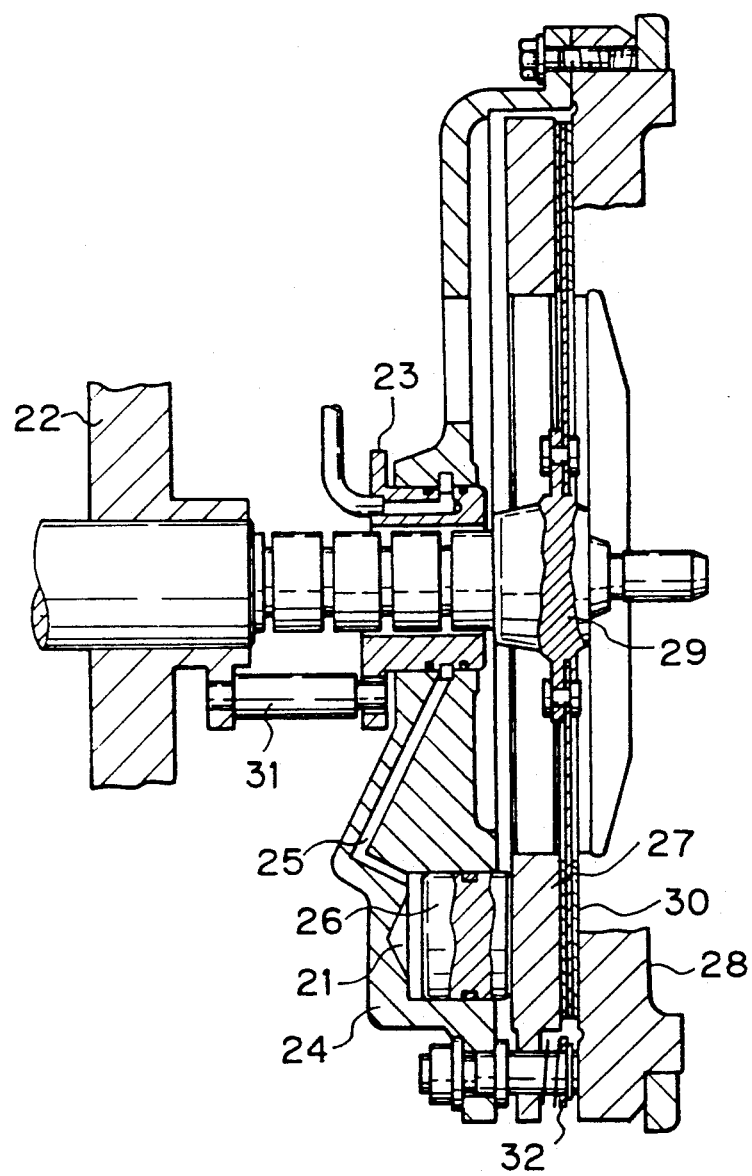
FIG. 7 is a detailed cross-sectional view of the clutch in FIG. 1.
Figure 9:
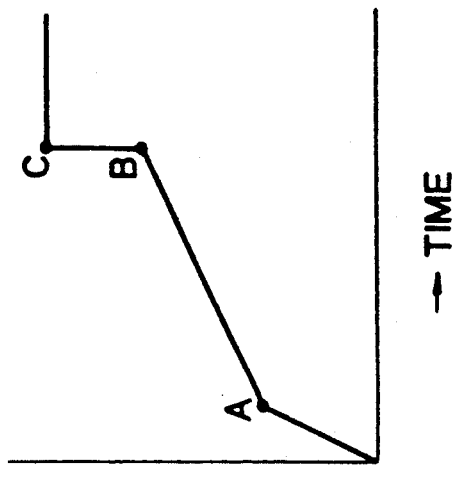
FIG. 9 is a diagram illustrating the rise of the pressure controlled by the accumulators.

FIG. 6 shows the inching valve 7 and the pressure regulating valve 10 arranged in a common body 80, as used in a conventional transmission with a torque converter. The body 80 includes an inlet port (pump port) 77, an exit port (clutch port) 78, and a return port (tank port) 79. Arranged in the body 80 are an inching piston 71 biased by an inching reaction spring 72, a inching shaft 73 in alignment with the inching piston 71 and biased by a set spring 76, and an inching spring 74 between the inching piston 71 and the inching shaft 73. The inching shaft 73 is biased to the position shown in the drawings by the set spring 76 and connected to a pedal 75 (FIG. 1), whereby it can be pulled in the direction of the arrow. The inching piston 71 moves according to the position of the inching shaft 73 so that, in the position shown in the drawings, the pump port 77 communicates with the clutch port 78 but is blocked from the tank port 79; in another position, the pump port 77 communicates with both the clutch port 78 and the tank port 79; in a further position, the pump port 77 is blocked and the clutch port 78 and the tank port 79 communicate with each other.

Accordingly, it is possible to engage or disengage the clutch by manually operating the inching valve 7.

FIG. 7 shows the clutch comprising a clutch disk 30 mounted on an input shaft 29, a fly wheel 28, a pressure plate 27, and the clutch actuating hydraulic cylinder 21 having a piston 26 wherein the engagement of the clutch is effected by admitting the hydraulic oil to the clutch actuating hydraulic cylinder 21, to cause the pressure plate 27 to press the clutch disk 30 against the fly wheel 28, and the disengagement of the clutch is effected by releasing the hydraulic oil from the clutch actuating hydraulic cylinder 21. The hydraulic oil is admitted from a rotary valve 23 supported at clutch housing 22 through an oil way 25 formed in a clutch cover 24, to the clutch actuating hydraulic cylinder 21.

The operation of this embodiment will now described.

Figure 8:
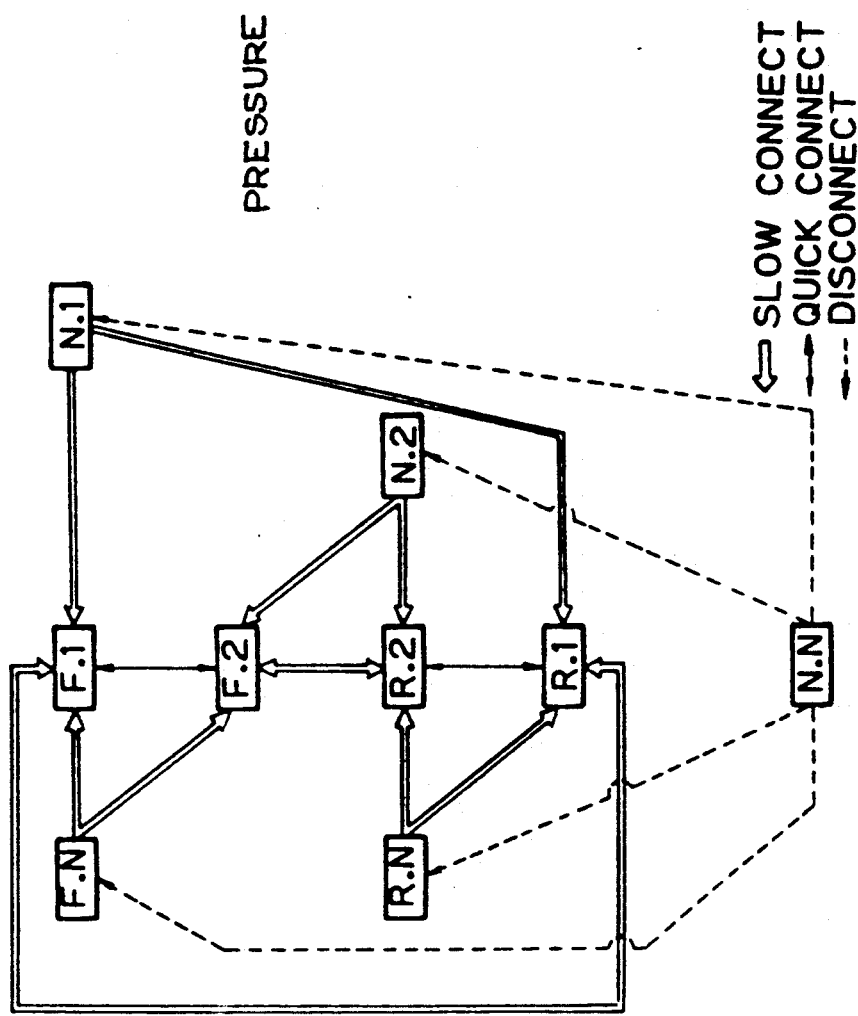
FIG. 8 is a diagram illustrating the shift patterns and the clutch engagement in the transmission with two forward positions and two reverse positions.

FIG. 8 shows all the shift patterns and the clutch engagements in the transmission with two forward positions and two reverse positions; in which "N" represents a neutral position, "F" a forward position, "R" a reverse position, "1" a low speed, and "2" a high speed.

Also, the double line arrow represents a slow clutch engagement in which both the first and second accumulators 18 and 19 function; the solid line arrow shows a quick clutch connection in which only the second accumulator 19 functions; and the broken line arrow shows a clutch disconnection.

A popular shift pattern is described as an example.

When the speed change shift lever 12 and the forward and reverse shift lever 11 are at the respective neutral positions, the boosters 6 and 5 are also at the respective neutral positions, so that the hydraulic oil delivered from the oil pump 1 through the flow dividing valve to the booster circuit 4 flows through the boosters 6 and 5 to the oil tank 2. Also, the speed change gate valve 17 and the forward and reverse gate valve 16 are at the respective open positions, so the hydraulic oil delivered from the oil pump 1 through the flow dividing valve 3 to the clutch circuit 8 flows through the pressure control circuit 13 to the oil tank 2, the disengagement of the clutch being maintained.

When the speed change shift lever 12 is operated to the low position, to cause the vehicle to start, the input shaft 51 of the speed change booster 6 is moved and then the piston rod 52 is moved in the same direction. Thus the gears of the transmission mechanically connected to the piston rod 52 are moved to the low speed position, and simultaneously, the speed change gate valve 17 is brought to the closed position. In this situation, however, the forward and reverse gate valve 16 is still in the open position, and thus the disengagement of the clutch is maintained.

In this situation, when the forward and reverse shift lever 11 is moved to the forward position (or reverse position), the input shaft 51 of the forward and reverse booster 5 is moved and then the piston rod 52 is moved in the same direction. Thus the gears of the transmission mechanically connected to the piston rod 52 are moved to the forward position, and simultaneously the forward and reverse gate valve 16 is brought to the closed position, causing the pressure control circuit 13 to be blocked from the oil tank 2. Accordingly, the pressure in the pressure control circuit 13, and thus the pressure in the clutch circuit 8 and in the clutch actuation hydraulic cylinder 21, is increased to a predetermined value under control of the pressure regulating valve 10, so that the clutch is engaged. In this case, a rise of the pressure is regulated by both the first and the second accumulators 18 and 19, i.e., the pressure rises gradually, so that the clutch is slowly engaged, making it possible to start the vehicle smoothly without any shock.

During this starting operation, the gate valve 15 in the pressure control circuit 13 is instantaneously opened when one of the speed change shift lever 12 and the forward and reverse shift lever 11 is operated, but is returned to the closed position with the completion of the lever operation.

Then, when the speed change shift lever 12 is moved from the low position to the high position, the low gears are first disengaged and then the high gears are engaged. When the low gears are first disengaged, the gate valve 15 is instantaneously opened in response to the booster actuating pressure, i.e., the pressure in the booster circuit 4 upstream of the speed change booster 6, by the pilot pressure from the pilot line 14, and the pressure of the clutch actuating hydraulic cylinder 21 is released to disengage the clutch. The gate valve 15 is maintained open while the speed change booster 6 is being operated; namely, the low gears are disengaged substantially after the clutch is disengaged.

In addition to the release of the hydraulic oil from the clutch actuating hydraulic cylinder 21, the hydraulic oil accumulated in the second accumulator 19 is released therefrom to the oil tank 2 when the gate valve 15 is opened. The first accumulator 18 is arranged between check valve 20 and the forward and reverse gate valve 16, which is closed at that time, and the hydraulic oil accumulated in the first accumulator 18 is not released to the oil tank 2, so that the first accumulator 18 remains full of the pressurized hydraulic oil. Then, the transmission is changed to engage the high gears through the neutral position, accompanying the closure of the speed change gate valve 17 and the gate valve 15, to increase the clutch actuating pressure. In this case, a rise of the hydraulic pressure is regulated only by the second accumulator 19, and thus the pressure rises in a shorter time than in the case of the start of the vehicle, and the clutch is quickly engaged.

In a modification of the present invention, it is possible to effect the slow clutch engagement and the quick clutch engagement if the gate valve 15 is omitted, since the speed change gate valve 17 passes through the neutral open position when changed from the low position to the high position, and vice versa, to thereby once release the hydraulic oil from the clutch actuation hydraulic cylinder 21 and the second accumulator 19.

The hydraulic oil accumulated in the first accumulator 18 is released to the oil tank 2 only when the transmission is operated from the forward position to the reverse position, and vice versa, but it is understood that this operation of the transmission is substantially the same as at the start of the vehicle, and thus the slow clutch engagement is preferable to a quick clutch engagement.

When a more delicate clutch operation is required than that obtained by the above-described pressure rise control through the first and the second accumulators 18 and 19, it is possible to appropriately engage and disengage the clutch by controlling the pressure of the hydraulic oil applied to the clutch actuation hydraulic cylinder 21, by a manual operation of the inching valve 7 by the operator, to thereby vary the set load of the inching spring 74 of the inching piston 71 shown in FIG. 6.

In summary, the control of the rise of the clutch actuating pressure by the first and the second accumulators 18 and 19 is shown in FIG. 8, in which the double line arrow represents the slow clutch engagement and the solid line arrow the quick clutch engagement. The slow clutch engagement is effected under the regulation of both the first and second accumulators 18 and 19 when the vehicle is started and the transmission is at the low position or the high position, and the quick clutch engagement is effected under the regulation of only the second accumulator 19 when the transmission shift lever is moved from the low position to the high position, and vice versa.

Figure 10:
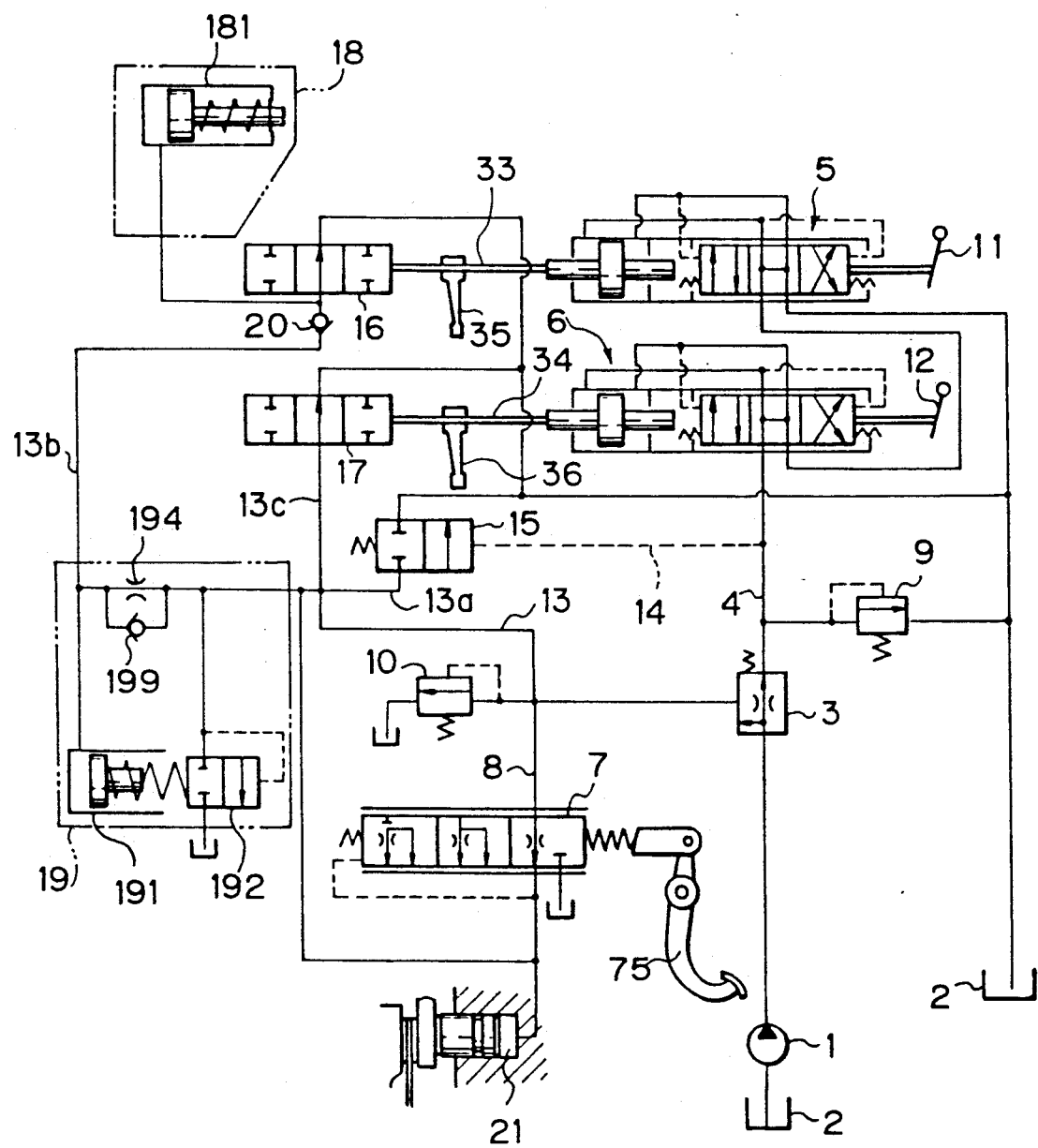
FIG. 10 is a circuit diagram of the second embodiment of the present invention.

FIG. 10 shows the second embodiment according to the present invention in which like elements are represented by the same reference numerals as in FIG. 1. The second embodiment has a generally similar arrangement to that shown in FIG. 1, and the difference therebetween is that the branch point of the pressure control circuit 13 to the clutch circuit 8 is located between the flow dividing valve 3 and the inching valve 7. Accordingly, the operation and the advantages of the second embodiment are similar to those of the first embodiment.

Figure 11:
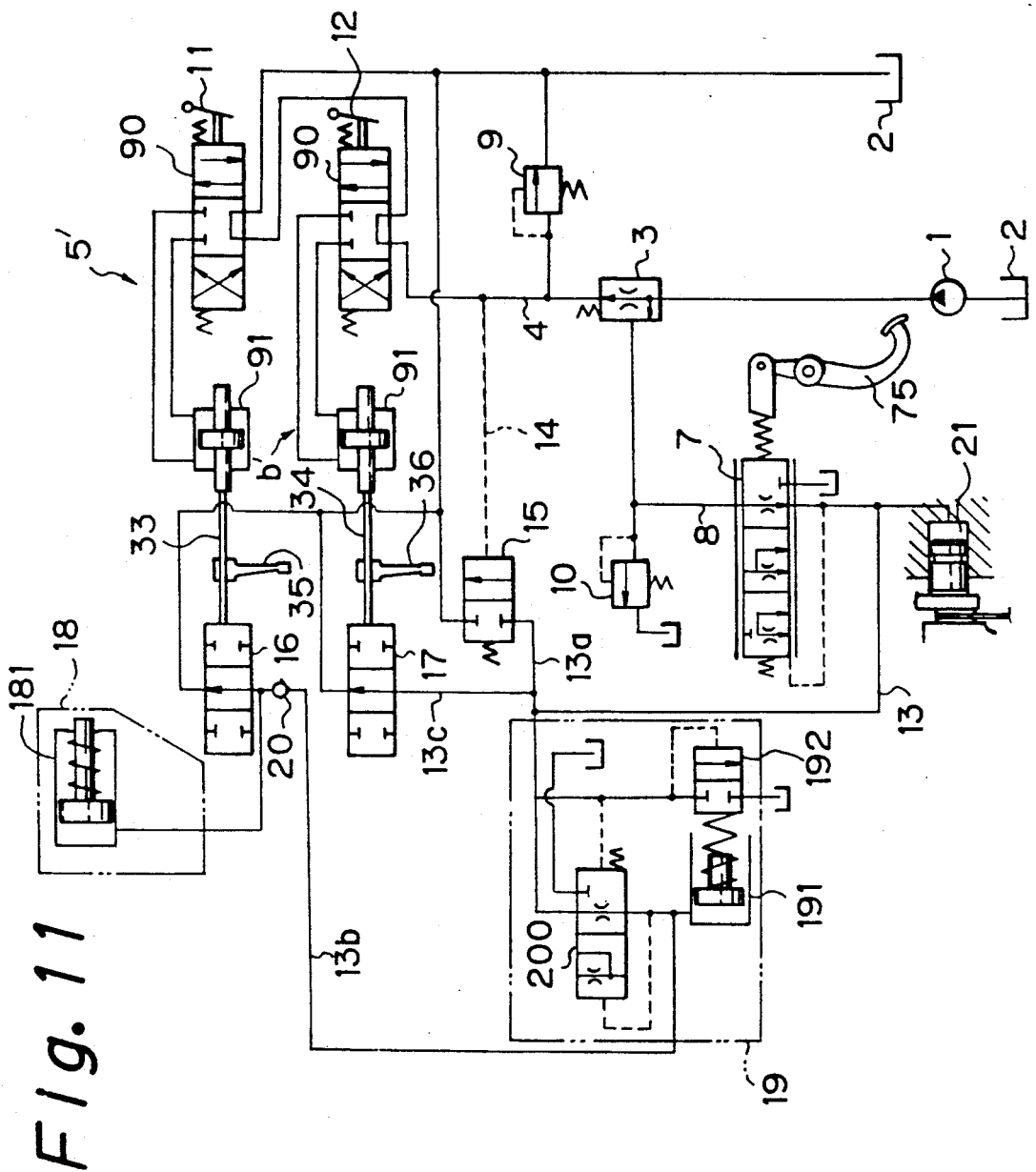
FIG. 11 is a circuit diagram of the third embodiment of the present invention.

FIG. 11 shows the third embodiment according to the present invention in which like elements are represented by the same reference numerals as in FIG. 1. In the third embodiment, the second accumulator 19 comprises a flow control valve 200 in place of the orifice 194 and the check valve 199, so that the hydraulic oil accumulated in the second accumulator 19 can be directly released to the oil tank 2 when the second accumulator 19 is to be released. Also, the booster circuit 4 includes a gear actuating hydraulic means comprising, in series, a speed change shift actuator 6' and a forward and reverse shift actuator 5', in place of the speed change shift booster 6 and the forward and reverse shift booster 5 in FIG. 1. Each of the actuators 6 and 6, comprises a combination of a flow control valve 90 and a hydraulic shift cylinder 91. Each of the hydraulic shift cylinders 91 is a double acting hydraulic cylinder with a neutral position, and each of the flow control valves 90 has a single inlet port in communication with the oil pump 1, a single exit port in communication with the oil tank 2 (through the other flow control valve 90) and two ports communicable with the opposite working chambers in the hydraulic shift cylinder 91, respectively. The flow control valve 90 comprises a spring offset type valve which automatically returns to the central neutral position after the flow control valve 90 is operated to change the position of the transmission. The operation and the advantages of the second embodiment are similar to those of the first embodiment.

Figure 12:
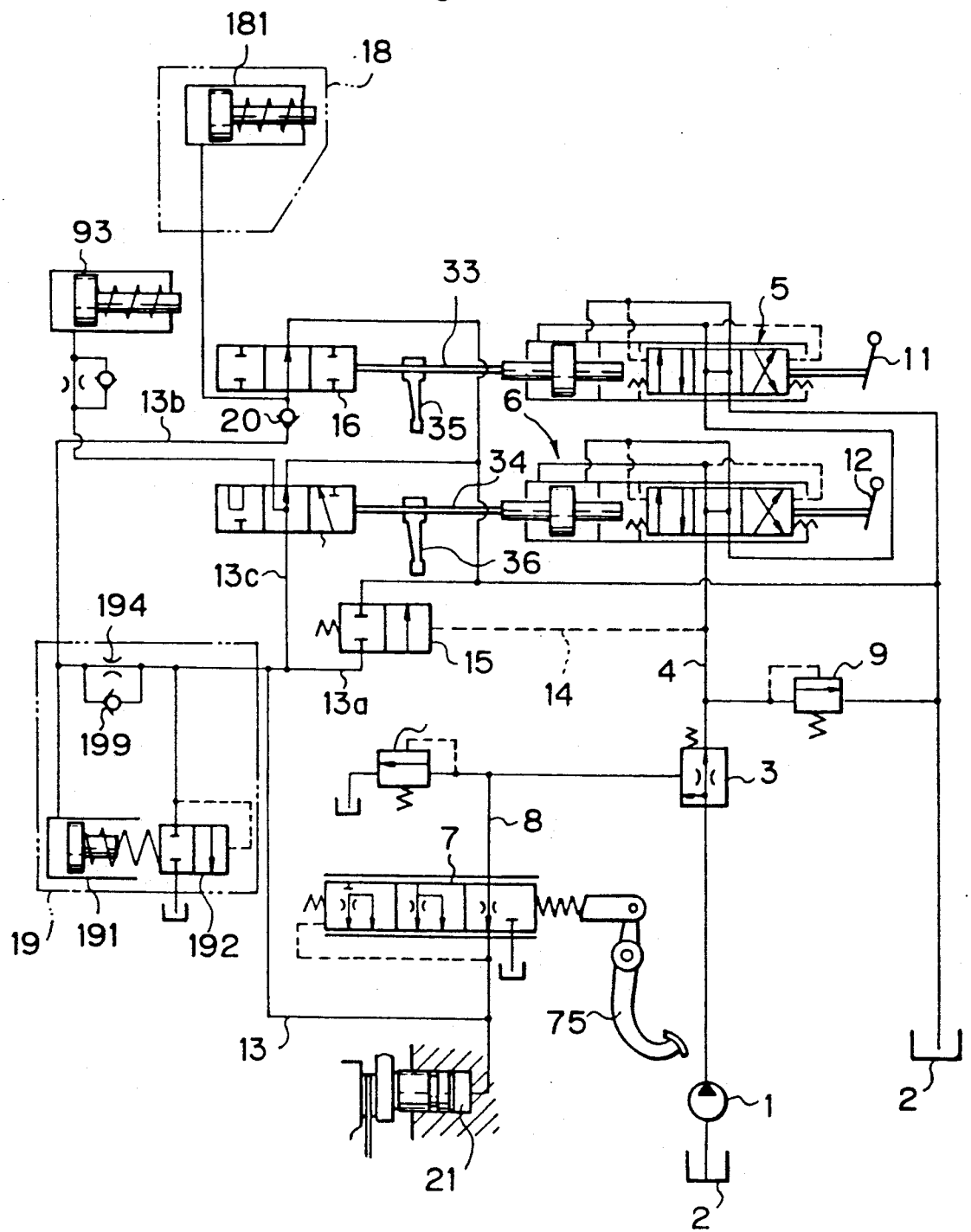
FIG. 12 is a circuit diagram of the fourth embodiment of the present invention.

FIG. 12 shows the fourth embodiment according to the present invention in which like elements are represented by the same reference numerals as in FIG. 1. In the fourth embodiment, the speed change gate valve 17 is modified and a third accumulator 93 is added and connected to the speed change gate valve 17 so that the hydraulic oil is not accumulated in the third accumulator 93 when the speed change gate valve 17 is moved to the low position, and is accumulated therein when the speed change gate valve 17 is moved to the high position. The first, second and third accumulators 18, 19, and 93 work in the manner shown in FIG. 13 in which the numerals 1, 2, and 3 enclosed by circles represent the functionings of the respective first, second, and third accumulators 18, 19, and 93.

Figure 13:
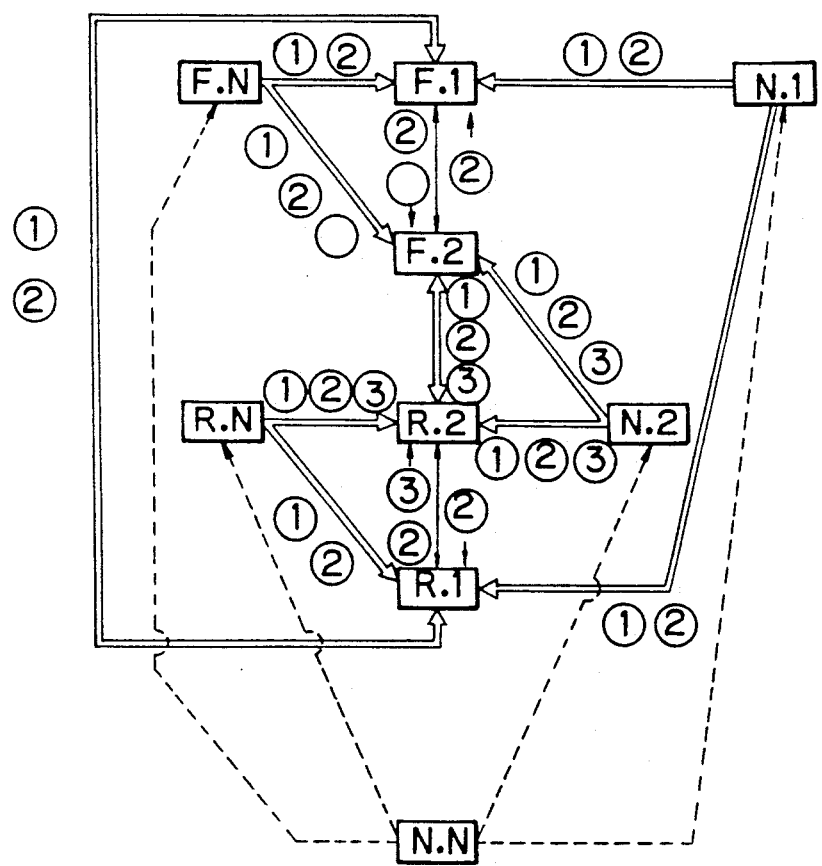
FIG. 13 is a diagram illustrating the shift patterns and the clutch engagement according to the fourth embodiment.
Figure 14:
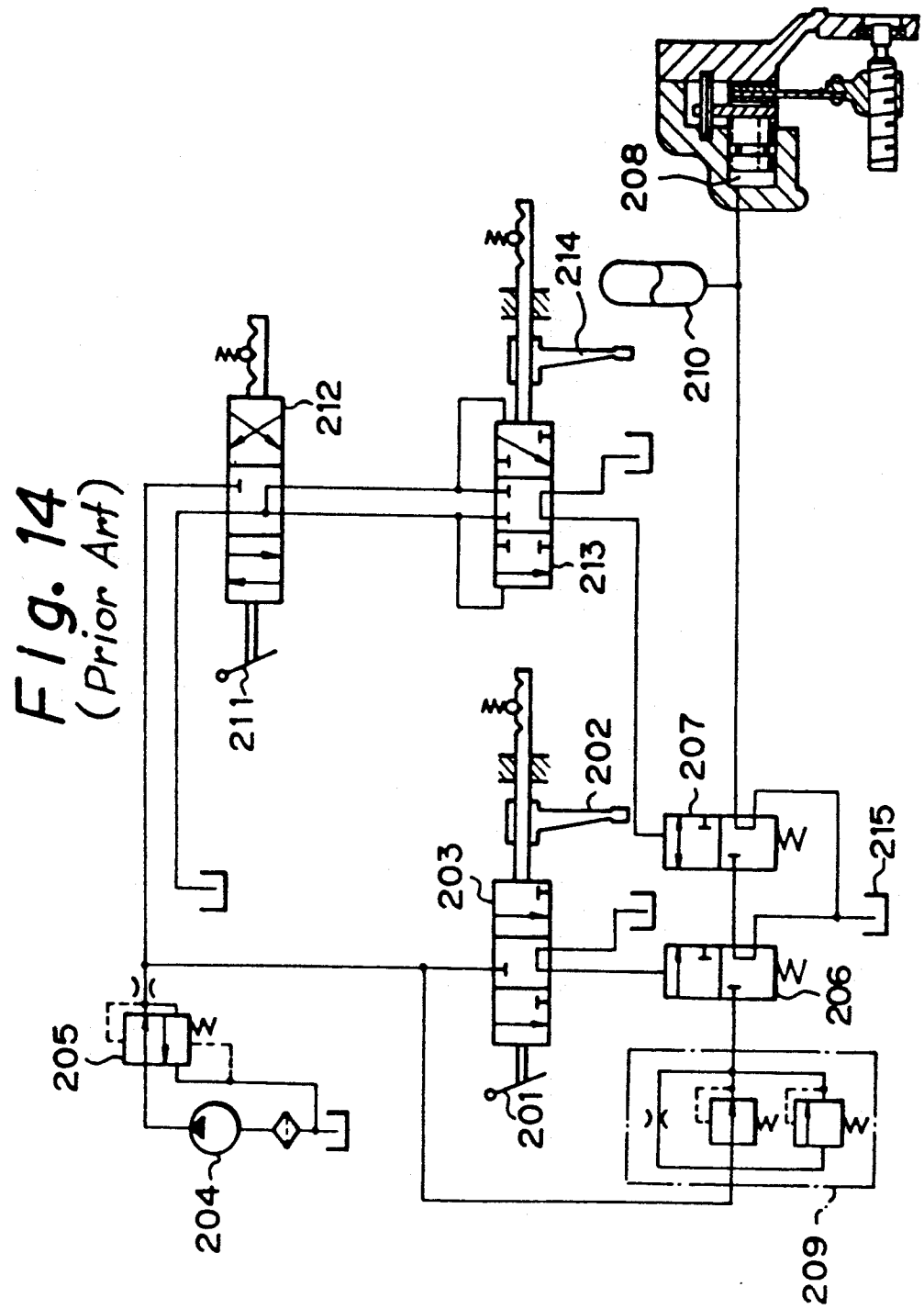
FIG. 14 is a circuit diagram of a hydraulic device for operating a clutch according to the prior art.

As shown in FIG. 13, when the vehicle is started at a low speed, a slow clutch engagement is established in which the clutch actuation pressure rises under the regulation of the first and the second accumulators 18 and 19. When the vehicle is started at a high speed, a very slow clutch engagement is established in which the clutch actuation pressure rises under the regulation of the first, second, and third accumulators 18, 19, and 93. Also, when the speed change is carried out from the low speed to the high speed, a quick clutch engagement is established in which the clutch actuation pressure rises under the regulation of the second and the third accumulators 19 and 93. When the speed change is carried out from the high speed to the low speed, a very quick clutch engagement is established in which the clutch actuation pressure rises under the regulation of only the second accumulator 19.

In this way, according to the fourth embodiment, it is possible to establish a finer control than in the previous embodiments, by adequately selecting the volumes of the first, second, and third accumulators 18, 19 and 93.

We claim:

1. A hydraulic device for operating a clutch in an industrial vehicle having a motor and a transmission having at least two forward positions and at least two reverse positions with said clutch arranged between said motor and said transmission, said transmission comprising a set of shift changeable gears and at least one manually operable shift lever, said hydraulic device comprising:
   hydraulic pump means;
   a clutch actuating hydraulic cylinder for hydraulically actuating said clutch;
   a first clutch actuating hydraulic circuit extending between said hydraulic pump means and said clutch actuating hydraulic cylinder;
   a second gear actuating hydraulic circuit extending between said hydraulic pump means and gear actuating hydraulic means for hydraulically actuating said shift changeable gears in response to a movement of said at least one shift lever; and
   a gate valve arranged in said first hydraulic circuit and movable in response to a pressure of a hydraulic oil in said second hydraulic circuit so that said gate valve is normally closed so that pressure in said first circuit is at a high pressure level to bring the clutch to an engaged condition and is opened for releasing a hydraulic oil in said first hydraulic circuit to an oil tank when said at least one manually operable shift lever is moved so that pressure in said first circuit is at a low pressure level to bring the clutch to a disengaged condition.

2. A hydraulic device according to claim 1, wherein said gear actuating hydraulic means has a single inlet port.

3. A hydraulic device according to claim 2, wherein said gear actuating hydraulic means comprises a speed change hydraulic shift means having a single inlet port and a single exit port, and a forward and reverse hydraulic shift means having a single inlet port and a single exit port, said speed change hydraulic shift means and said forward and reverse hydraulic shift means being connected in series between said oil pump and said oil tank.

4. A hydraulic device according to claim 3, wherein said gate valve has a pilot line leading to said second gear actuating hydraulic circuit upstream of said series of said first speed change hydraulic shift means and said second forward and reverse hydraulic shift means.

5. A hydraulic device according to claim 1, wherein said at least one manually operable shift lever comprises a speed change shift lever and a forward and reverse shift lever, and said gear actuating hydraulic means comprises a speed change gear actuating hydraulic means connected to said speed change shift lever and a speed change gear actuating hydraulic means connected to said forward and reverse shift lever.

6. A hydraulic device according to claim 5, wherein said gate valve has a pilot line leading to said second gear actuating hydraulic circuit upstream of said speed change gear actuating hydraulic means and said speed change gear actuating hydraulic means.

7. A hydraulic device according to claim 2, wherein said gear actuating hydraulic means comprises at least one hydraulic shift booster having a casing having a single inlet port, a single exit port, hydraulic cylinder means, a piston arranged in said hydraulic cylinder means so that first and second cylinders are provided on either side of said piston, an infeed passage between said inlet port and both of said first and second cylinders, a return passage extending between said exit port and both of said first and second cylinders, and a valve member movable in response to a movement of said at least one shift lever so that said valve member selectively restricts a portion of the passage of said infeed passage extending toward one of said first and second cylinders.

8. A hydraulic device according to claim 2, wherein said gear actuating hydraulic means comprises at least a combination of a flow control valve and a hydraulic cylinder, said flow control valve having a single inlet port, a single exit port, and two ports extending toward said hydraulic cylinder.

9. A hydraulic device according to claim 2, wherein said gear actuating hydraulic means comprises a pair of combinations of a flow control valve and a hydraulic cylinder, each of said flow control valves having a single inlet port, a single exit port, and two ports extending toward said associated hydraulic cylinder.

10. A hydraulic device according to claim 9, wherein said flow control valves are arranged in series.

11. A hydraulic device according to claim 1, wherein a manually operable inching valve is arranged in said first clutch actuating hydraulic circuit for releasing hydraulic oil admitted to said clutch actuating hydraulic cylinder.

12. A hydraulic device for operating a clutch in an industrial vehicle having a motor and a transmission, with said clutch arranged between said motor and said transmission, said transmission comprising a set of shift changeable gears, a forward and reverse shift lever having a neutral position, a forward position, and a reverse position, and a speed change shift lever having a neutral position and at least two speed change positions, said hydraulic device comprising:

hydraulic pump means;

a clutch actuating hydraulic cylinder for hydraulically actuating said clutch;

a first clutch actuating hydraulic circuit extending between said hydraulic pump means and said clutch actuating hydraulic cylinder;

a second pressure controlling hydraulic circuit branched from said first clutch actuating hydraulic circuit to an oil tank, said second pressure controlling hydraulic circuit including branched third and fourth hydraulic circuits in parallel to each other;

a first forward and reverse gate valve arranged in said third hydraulic circuit and movable in response to a movement of said forward and reverse shift lever so that said first gate valve is opened when said forward and reverse shift lever is at said neutral position and closed when said forward and reverse shift lever is at one of said forward and reverse positions;

second speed change gate valve arranged in said fourth hydraulic circuit and movable in response to a movement of said speed change shift lever so that said second gate valve is opened when said speed change shift lever is at said neutral position and closed when said speed change shift lever is at one of said speed change positions;

a check valve arranged in said third hydraulic circuit upstream of said first gate valve so that a flow of the hydraulic oil toward said first hydraulic circuit is prevented;

a first accumulator arranged in said third hydraulic circuit between said check valve and said first gate valve for controlling a rise of a pressure applied to said clutch actuating hydraulic cylinder; and a second accumulator arranged in said second hydraulic circuit upstream of said second gate valve for controlling a rise of a pressure applied to said clutch actuating hydraulic cylinder.

13. A hydraulic device according to claim 12, wherein a further gear actuating hydraulic circuit is extended from said hydraulic pump means, and a first forward and reverse hydraulic shift means and a second speed change hydraulic shift means are arranged in said further gear actuating hydraulic circuit for hydraulically actuating said shift changing gears in response to a movement of said forward and reverse shift lever and speed change shift lever, respectively.

14. A hydraulic device according to claim 12, wherein each of said first forward and reverse hydraulic shift means and said second speed change hydraulic shift means comprises a hydraulic shift booster having a casing having a single inlet port, a single exit port, hydraulic cylinder means, a piston arranged in said hydraulic cylinder means so that first and second cylinders are provided on either side of said piston, an infeed passage between said inlet port and both of said first and second cylinders, a return passage extending between said exit port and both of said first and second cylinders, and a valve member movable in response to a movement of said at least one shift lever so that said valve member selectively restricts a portion of the passage of said infeed passage extending toward one of said first and second cylinders.

15. A hydraulic device according to claim 12, wherein each of said first forward and reverse hydraulic shift means and said second speed change hydraulic shift means comprises at least a combination of a flow control valve and a hydraulic cylinder, said flow control valve having a single inlet port, a single exit port, and two ports extending toward said hydraulic cylinder.

16. A hydraulic device according to claim 12, wherein a manually operable inching valve is arranged in said first clutch actuating hydraulic circuit for releasing hydraulic oil admitted to said clutch actuating hydraulic cylinder.

* * * * *

UNITED STATES PATENT AND TRADEMARK OFFICE
CERTIFICATE OF CORRECTION

PATENT NO. : 5,083,646

DATED : January 28, 1992

INVENTOR(S) : T. Takeuchi et al

It is certified that error appears in the above-identified patent and that said Letters Patent is hereby corrected as shown below:

Col. 9, line 17, "161," should read --161'--.

Col. 12, line 56, "6," (second occurrence) should read --6'--.

Signed and Sealed this

Twenty-sixth Day of October, 1993

Attest:

BRUCE LEHMAN

Attesting Officer

Commissioner of Patents and Trademarks